United States Patent
Benoit

[11] Patent Number: 6,163,936
[45] Date of Patent: Dec. 26, 2000

[54] BOAT SAVER

[76] Inventor: Richard Benoit, 6 Main St. Ext., Plymouth, Mass. 02360

[21] Appl. No.: 09/163,176

[22] Filed: Sep. 30, 1998

[51] Int. Cl.[7] .................................................. B63B 21/04
[52] U.S. Cl. ........................... 24/130; 24/135 R; 114/218
[58] Field of Search ................... 24/129 R, 130, 24/135 R, 712.9, 115 R; 114/218, 230

[56]  References Cited

U.S. PATENT DOCUMENTS

| | | |
|---|---|---|
| 774,900 | 11/1904 | Wilson . |
| 3,265,032 | 8/1966 | Hume . |
| 3,574,900 | 4/1971 | Emery . |
| 3,758,922 | 9/1973 | Field . |
| 4,361,938 | 12/1982 | Emery . |
| 4,397,253 | 8/1983 | Uecker et al. . |
| 5,806,452 | 9/1998 | Benoit . |

FOREIGN PATENT DOCUMENTS 196 12 214   10/1996   Germany .

*Primary Examiner*—James R. Brittain
*Attorney, Agent, or Firm*—Patent & Trademark Services; Joseph H. McGlynn

[57] ABSTRACT

A holder for lines on a boat wherein the holder has internal grooves formed by alternating teeth and which are used to hold a line when force is exerted in one direction and which allow the removal of the line from the holder by pulling on the line in an opposite direction. In addition, the alternating teeth are formed of different heights to accommodate lines of different diameters.

4 Claims, 1 Drawing Sheet

BOAT SAVER

BACKGROUND OF THE INVENTION

This invention relates, in general, to a holder for lines on a boat, and, in particular, to a holder for different diameters of lines.

Boating in all forms has become very popular. To protect boat's hull when docking resilient protective devices known as "fenders" are usually installed on the sides of a boat to protect the boat from damage that might occur if the boat hits the dock. These protective devices are attached to selected posts on the boat with lines that have the fenders attached thereto. Proper placement of the fenders requires a degree of skill to insure that the moving boat will not become damaged by striking the piers or dock. Another problem associated with the placement of the fenders is that all of the lines may not be of the same diameter, or some of the lines can be worn through use and, therefore have portions that are no longer of a consistent diameter.

Since it is critical that boat fenders be deployed quickly, in some instances, it is necessary to have a holder that lines can be attached to quickly and easily. In addition, the holder must hold the lines securely so that the fender will remain in the proper position to protect the sides of the boat. Also, the holder must be able to accommodate any size line in order to prevent the accidental loss of expensive fenders.

The present invention seeks to facilitate the installation of the fenders by providing for a holder for the lines which permit the lines to be released when pulled in one direction and gripped tightly when pulled in the opposite direction. In addition, the present invention will accommodate lines of different diameters.

DESCRIPTION OF THE PRIOR ART

Devices for retaining boat protectors or fenders are known in the prior art. For example, U.S. Pat. No. 3,574,900 to Emery discloses a cleat for securing a line and the cleat has a plurality of tapered legs with the same size grooves on each leg.

U.S. Pat. No. 3,758,922 to Field discloses a pair of sliding wedges for securing a line on a boat and the wedges have a plurality of legs with the same size grooves on each leg.

U.S. Pat. No. 4,361,938 to Emery discloses a jamming cleat with a tapered groove to receive a line and the groove has a plurality of tapered surfaces with the same size grooves on each surface.

The present invention is a post mounted holder for a boat line having a grooved cord engaging cleat and a post mount as described in this specification. In addition, the holder has structure will allow the holder to engage and secure lines of different diameters.

SUMMARY OF THE INVENTION

This invention relates to a holder for lines on a boat wherein a cleat has internal grooves formed by alternating teeth and which are used to hold a line when force is exerted in one direction and which allow the removal of the line from the cleat by pulling on the line in an opposite direction. In addition, the alternating teeth are formed of different heights to accommodate lines of different diameters.

It is the primary object of the present invention to provide for an improved line holder on a boat.

Another object is to provide a line holder in which the line can be secured to the holder by pulling on the line in one direction and released when the line is pulled in another direction.

Another object is to provide a line holder which can be used to secure lines of different diameters.

These and other objects and advantages of the present invention will become apparent to readers from a consideration of the ensuing description and the accompanying drawings.

DESCRIPTION OF THE PREFERRED EMBODIMENT

Figure 1:
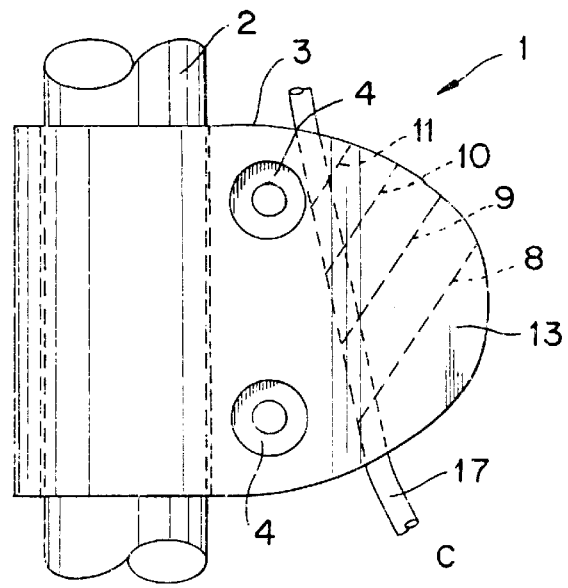
FIG. 1 is a side view of the present invention mounted on a post on a boat.
Figure 3:
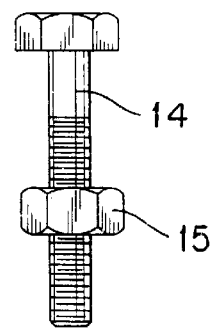
FIG. 3 shows a side view of a nut and bolt used to secure the present invention to the post.
Figure 2:
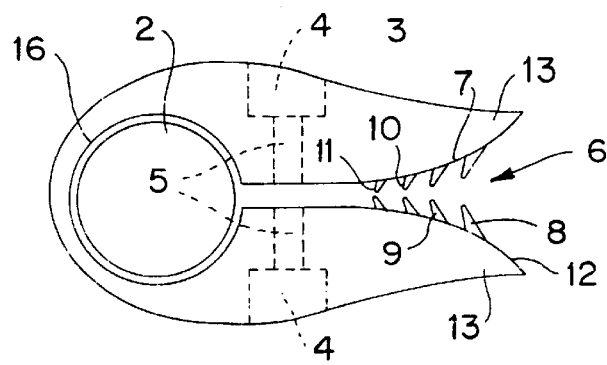
FIG. 2 is a top view of the present invention mounted on a post on a boat.

Referring now to the drawings in greater detail, FIG. 1 shows the present invention 1 mounted on a post 2 which is secured to a portion of a boat (not shown). The cleat or holder 3 encircles the post 2 (as seen in FIG. 2) and is clamped to the post 2 by means of a bolt 14 and nut 15. The bolt 15 passes through the countersunk area 4 and into the passages 5. The nut is received in the countersunk area 4 on the other side of the holder 3 and by tightening the bolt and nut the holder is firmly secured around the post 2. The countersunk areas 4 allow the head of the bolt and the nut to be below the outside surface of the holder 3 in order to prevent them from fraying the lines that will be attached to the holder 3.

In order to attach the holder 3 to the post 2, a user will grasp the holder 3 by the slanted surfaces 12, see FIG. 2, and spread the holder apart thereby widening the passageway 6 between the two arms 13 of the holder. When the passageway 6 is wide enough the holder will be placed around the post 2 until the post slips into the circular portion 16 in the holder 3. Then the bolt 14 and nut 15 can be placed into the countersunk areas 4 and the passages 5 and tightened until the holder is firmly secured around the post 2.

The holder 3 is preferably molded as a single unitary piece. Also it should be made from a relatively flexible material so that it can be expanded to fit around the post 2 without breaking.

In order to engage lines and hold them securely, the two arms 13 of the holder have a plurality of teeth 8, 9, 10, 11 which are formed on the opposite, inside surfaces of the arms 13.

Figure 4:
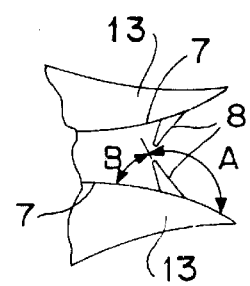
FIG. 4 shows a partial view of the holder of the present invention showing one pair of the slanted teeth used with the present invention.

FIG. 4 shows two of the teeth 8 to show the slanted configuration of the teeth which allows the line 17 to be easily and quickly attached to the holder 3. In should be noted that the other teeth 9, 10, 11 are similarly slanted, however they are not shown in FIG. 4 for clarity. As can be seen in FIG. 4, the angle B that the inner side of teeth 8 makes with the inside surface 7 of the arms 13 is smaller than the angle A that the outer side of teeth 8 makes with the inside surface 7 of the arms 13. This causes the teeth to "lean" or slant toward the inner portions of the arms 13, i.e. the portions of arms 13 that are closest to passageways 5. Therefore, if a line 17 is pulled downward (in the direction of the arrow C in FIG. 1), the teeth will dig into the line and hold it securely. If the line 17 is pulled upward (opposite the direction of the arrow C in FIG. 1), the teeth will not dig into the line and hold it securely, i.e. they will allow the line to be removed from the holder. In this manner pulling the line in one direction will allow a user to quickly secure the line in the holder 3. Also, it should be noted that weight of a fender attached to the line 17 will tend to pull the line in the direction of the arrow C. Therefore, the weight of the fender will tend to hold the line securely in the holder 3 and will help prevent the loss of a fender.

Preferably the holder 3 should be made of a relatively flexible moisture resistant material such as a molded plastic material. The present invention can be manufactured by the plastic injection molding process as a single unitary piece.

Figure 5:
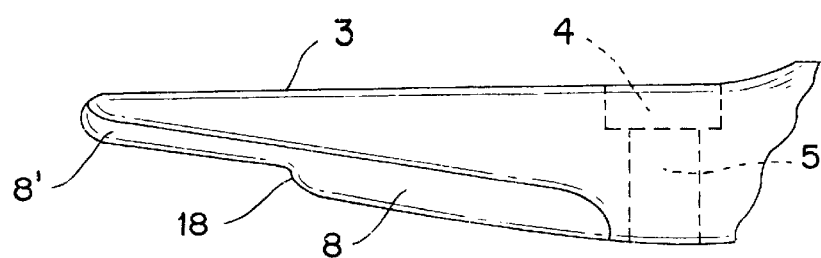
FIG. 5 shows a profile of one of the teeth used with the present invention.

As shown in FIG. 5, each of the teeth 8, 9, 10, 11 (only teeth 8 are shown in the figure for clarity) have at least two different heights as shown at 8 and 8'. A tapered or shoulder section 18 joins the two different heights 8, 8' to make a smooth transition between the different heights. As can be clearly seen in FIG. 5, the different heights produce a space between the teeth that is larger between the teeth sections 8' and smaller between the teeth sections 8. The different size spaces will allow the holder to receive and secure different size lines. That is a smaller diameter line can be placed between the teeth sections 8 and firmly secured as described above, and a larger diameter line can be placed between the teeth sections 8' and firmly secured as described above. This will allow the holder of the present invention to hold different diameters of lines.

In addition, although only two different height sections 8, 8' are shown. it should be understood that more than two different height sections may be provided on each tooth without departing from the scope of the present invention.

Although the Boat Saver and the method of using the same according to the present invention has been described in the foregoing specification with considerable details, it is to be understood that modifications may be made to the invention which do not exceed the scope of the appended claims and that modified forms of the present invention done by others skilled in the art to which the invention pertains will be considered infringements of this invention when those modified forms fall within the claimed scope of this invention.

What I claim as my invention is:

1. A holder for lines on a boat, said holder comprising:

a body member having a circular aperture at one end, a slot extending from said circular aperture to another end, a plurality of teeth unitarily formed on opposing sides of said slot, said plurality of teeth having at least two different heights, and wherein the height of teeth are higher on one side of said holder than on another side of said holder.

2. The holder as claimed in claim 1, wherein said holder has means for closing said slot.

3. The holder as claimed in claim 2, wherein said means for closing said slot is a passageway extending through said holder and a threaded fastener passing through said passageway.

4. The holder as claimed in claim 1, wherein said teeth are slanted away from said another end of said slot.

* * * * *